United States Patent

Boucher et al.

[11] Patent Number: 6,078,889
[45] Date of Patent: Jun. 20, 2000

[54] METHOD AND SYSTEM OF IMPLEMENTING A CARRIER MANAGER LIBRARIAN

[75] Inventors: Glenn Boucher, Shelton; Terri A. Carroll, Milford; Jacques E. Hasbani, Shelton; Kenneth Karbowski, Farmington; Edward M. Rauh, West Haven, all of Conn.

[73] Assignee: Pitney Bowes Inc., Stamford, Conn.

[21] Appl. No.: 08/942,262

[22] Filed: Sep. 30, 1997

[51] Int. Cl.[7] .............................. G06F 1/00; G06F 9/445; G06F 9/44

[52] U.S. Cl. .................................. 705/1; 705/28; 705/26; 705/10; 705/20

[58] Field of Search ................................. 705/1, 28, 402, 705/400, 34, 14, 417, 418; 235/385; 379/114; 380/15; 104/88.04

[56] References Cited

U.S. PATENT DOCUMENTS

| | | | |
|---|---|---|---|
| 4,736,687 | 4/1988 | Grube et al. | 104/88 |
| 5,072,397 | 12/1991 | Barns-Slavin et al. | 364/464.02 |
| 5,287,270 | 2/1994 | Hardy et al. | 364/408 |
| 5,293,310 | 3/1994 | Carroll et al. | 364/408 |
| 5,325,290 | 6/1994 | Cauffman et al. | 364/401 |
| 5,337,246 | 8/1994 | Carroll et al. | 364/464.02 |
| 5,473,630 | 12/1995 | Penzias et al. | 375/114 |
| 5,485,369 | 1/1996 | Nicholls et al. | 364/301 |
| 5,515,425 | 5/1996 | Penzias et al. | 379/114 |
| 5,631,827 | 5/1997 | Nicholls et al. | 395/228 |
| 5,666,493 | 9/1997 | Wojcik et al. | 705/26 |
| 5,729,457 | 3/1998 | Seymour | 364/449.9 |
| 5,758,329 | 5/1998 | Wojcik et al. | 705/28 |

FOREIGN PATENT DOCUMENTS

| | | |
|---|---|---|
| 0336552 A2 | 2/1989 | European Pat. Off. . |
| 010191232 | of 0000 | Japan . |
| WO 95/01598 A1 | 6/1994 | WIPO . |
| WO 98/33106 A1 | 1/1998 | WIPO . |

OTHER PUBLICATIONS

Bausch, Dan O. and Brown, Gerard G.; Dispaching shipments at minimal cost with multiple mode alternatives, Journal of Business Logistics, Jan. 1, 1994.

Andel, Tom; Rating/Routing Software: Make Special Deliveries Routine; Transportation and Distribution, Nov. 1, 1996.

Prince, Tyler and Kaufman, Scott; From Order to Loading Dock, Information Week, Nov. 14, 1995.

*Primary Examiner*—Allen R. MacDonald
*Assistant Examiner*—Pedro R. Kanof
*Attorney, Agent, or Firm*—Charles R. Malandra, Jr; Michael E. Melton

[57] ABSTRACT

A management librarian for shipping carriers is configured to access a registry containing carrier identifiers corresponding to the carriers and module identifier corresponding to carrier rate modules. The carrier rate modules contain item rating instructions arranged to rate the item for a respective carrier from among the carriers. The carrier management librarian is also configured to load into the executable space of a client application a selected carrier rate module corresponding to the selected carrier based on module identifiers accessed in the registry. An entry point for the item rating instructions is identified, based on an associated module identifier corresponding to the selected carrier.

21 Claims, 6 Drawing Sheets

CARRIER MANAGER REGISTRY LAYOUT

METHOD AND SYSTEM OF IMPLEMENTING A CARRIER MANAGER LIBRARIAN

RELATED APPLICATIONS

Reference is made to application Ser. No. 08/942,265, entitled INSTALLING SOFTWARE BASED ON A PROFILE, assigned to the assignee of this application and filed on even date herewith.

Reference is made to application Ser. No. 08/942,209, entitled CARRIER MANAGER INTERFACE UTILIZING AN OCX CONTROL, assigned to the assignee of this application and filed on even date herewith.

Reference is made to application Ser. No. 08/942,263, entitled A METHOD AND SYSTEM FOR ACCESSING CARRIER DATA, assigned to the assignee of this application and filed on even date herewith.

Reference is made to application Ser. No. 08/942,264, entitled A METHOD AND SYSTEM FOR CHANGING RATING DATA VIA INTERNET OR MODEM IN A CARRIER MANAGEMENT SYSTEM, assigned to the assignee of this application and filed on even date herewith.

Reference is made to application Ser. No. 08/942,260, entitled A METHOD AND SYSTEM OF IMPLEMENTING A CARRIER MANAGER REGISTRY, assigned to the assignee of this application and filed on even date herewith.

Reference is made to application Ser. No. 08/942,261, entitled EVENT INTERFACE FOR A CARRIER MANAGER SYSTEM, assigned to the assignee of this application and filed on even date herewith.

BACKGROUND OF THE INVENTION

A shipping carrier is a company that provides shipping services for letters, packages, bulk goods, or any other item to be shipped. Carriers can perform a variety of shipping services. For example, they can deliver express shipments, e.g. airmail for letters and second-day air for small packages. Moreover, carriers can deliver ground shipments for packages, or "LTL" shipments for bulk goods. The term "LTL" means "Less Than Truckload" and applies to any ground carrier shipment of standard commodities, for example, rated in units of hundreds of pounds. Shipments of bulk goods or standard commodities usually occupy a portion of a truck trailer, hence "less than truckload," but may require an entire truckload, occasionally known as "TL" shipments.

Each carrier has its own rate structure for charging shippers for transporting their goods. Typically, these rates structures are complex and involve a variety of factors. For example, carriers often charge different prices by weight, sometimes with different weight classifications. As another example, carrier rates may be dependent on the distance to the destination. In addition, some carriers charge a premium for shipping classes, e.g. first class and second class, with shorter or longer guaranteed delivery times. In some cases, carriers may grant discounts for volume. Thus, the business rules for rating items to be transported varies greatly from carrier to carrier. These rating calculations may change over time for a particular carrier as its rates and business rules are updated. Accordingly, it is desirable to provide mechanisms for logistics systems for shipping goods to facilitate updating how carrier rates are calculated.

According to one approach, the carrier rate information and business rules are isolated into separately executable programs on a per-carrier basis. Thus, updating a carrier rating program can occur independently of other carrier rating programs. For example, U.S. Pat. No. 5,631,827 issued May 20, 1997 to Nicholls et al. describes a logistics system in which carrier rate information and business rules are isolated into separate program objects, called "rate servers." These rate servers are spawned by a client process or a supervisory manager process and are concurrently executed with the client and supervisory processes in a multitasking operating system. Consequently, the rate servers communicate with the client and supervisory manager processes via an interprocess communication (IPC) mechanism, such as a named pipe. In this system, a client program formulates a tokenized message with information about an item to be rated and passes the tokenized message to a rate server for a desired carrier via a named pipe. The operating system suspends execution of the client program and performs a context swap granting the rate server a time slice to compute the rate calculation. When activated, the rate server decodes the tokenized message, performs the rate calculation, tokenizes a response, and sends the tokenized response back to the client program through IPC. Finally, the operation system puts the rate server to sleep and executes another context swap to resume execution of the client program, which decodes the tokenized response.

This system is resource intensive. For example, each concurrently executing rate server takes up an entry in a process table of the operating system, reducing the number of other processes that may be run concurrently. Moreover, there is processing overhead in tokenizing and decoding the messages used for the IPC mechanism as well as the overhead involved in the IPC mechanism itself. Another reason why the described system is resource intensive is that two context swaps are performed for every rate calculation. Context swaps are generally expensive in terms of processing time, because, for example, processor registers have to be saved and restored.

Often, it is difficult to add support for new carriers to conventional logistic systems. For example, the system described by Nicholls et al. employs a supervisory server for managing one or more carriers, and corresponding rate server and rate administrator programs for handling tasks specific to a carrier. As disclosed in TABLE II of the Nicholls et al. reference, the supervisory server associates each carrier with a program identifier from a file called PROGISTI.H. The ".H" suffix of the file conventionally indicates a header file, which are used to hard-code the program identifiers at compile time into the supervisory server executable. Thus, to add support for a new carrier in such a system, the source code and header files for at least the supervisory server have to be modified. A new supervisory server executable program object must be compiled, distributed to the customer's site, and re-installed, often at a substantial monetary cost.

SUMMARY OF THE INVENTION

There exists a need for a less resource-intensive, carrier management system that can calculate shipping rates for a plurality of carriers and allows ease of updating of individual carrier rates. More specifically, there is a need for carrier management system that does not need to spawn separate processes or use IPC mechanisms for communication.

These and other needs are met by the present invention, in which carrier rate modules, which isolate and encapsulate item rating functionality in the form of item rating instructions for respective carriers, are configured to be loaded into the executable space of an executing client application. By loading the carrier rate modules directly into the executable space of the executing client application, the client application can avail itself of functionality implemented in the modules without the overhead incurred for a separate process. Thus, entries in the process table of the operating system are saved and costly context swaps are avoided. Moreover, the requirement for IPC mechanisms for rating an item is eliminated because the carrier rate module is loaded into the same executable space as the client process.

A registry, such as a file stored on a computer-readable medium, records carrier identifiers corresponding to the carriers in one-to-one association with module identifiers. A module identifier indicates how to access and load a carrier rate module, e.g. a pathname or class identifier. A carrier management librarian module, methodology, and software is provided for managing the carrier rate modules. Specifically, the carrier management librarian is configured to access the registry and load a selected carrier rate module into the executable space of the executing client application, based on module identifiers accessed in the registry. The carrier management librarian is also configured to identify an entry point for the item rating instructions contained in the loaded, selected carrier rate module in response to an identifier specified by the client application.

Additional objects, advantages, and novel features of the present invention will be set forth in part in the description that follows, and in part, will become apparent upon examination or may be learned by practice of the invention. The objects and advantages of the invention may be realized and obtained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings and in which like: reference numerals refer to similar elements and in which.

DETAILED DESCRIPTION OF THE PREFERRED EMBODIMENTS

A system and a method for managing a plurality of carriers are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
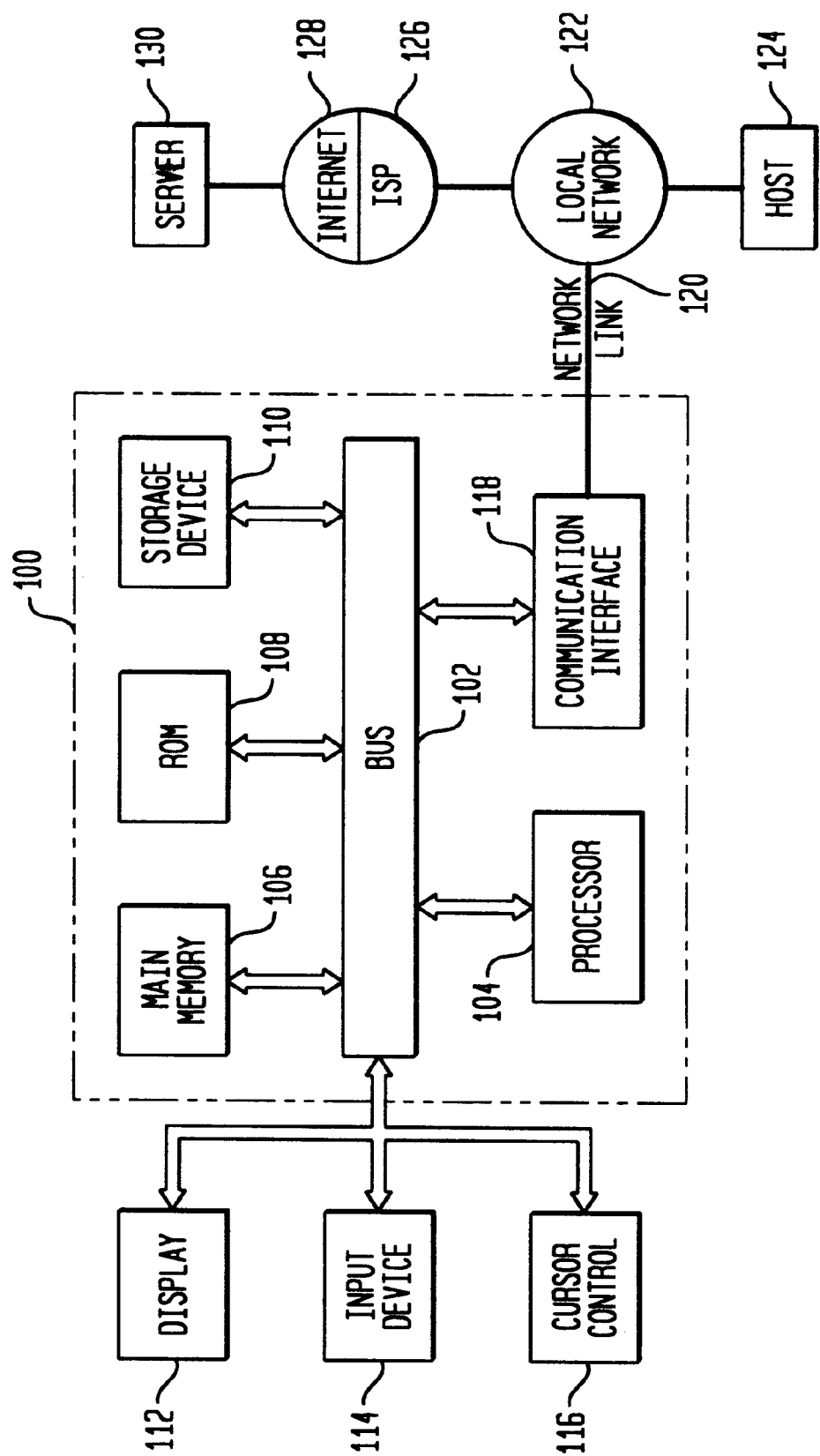
FIG. 1 is a depiction of a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions. Common examples of computer system 100 include personal computers, workstations, minicomputers, servers, and mainframes.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for managing carriers. According to one embodiment of the invention, carrier management is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for carrier management as described herein.

The received code may be executed by processor 104 as it is received, and/or stored in storage device 110, or other non-volatile storage for later execution. In this manner, computer system 100 may obtain application code in the form of a carrier wave.

System Overview

Figure 2:
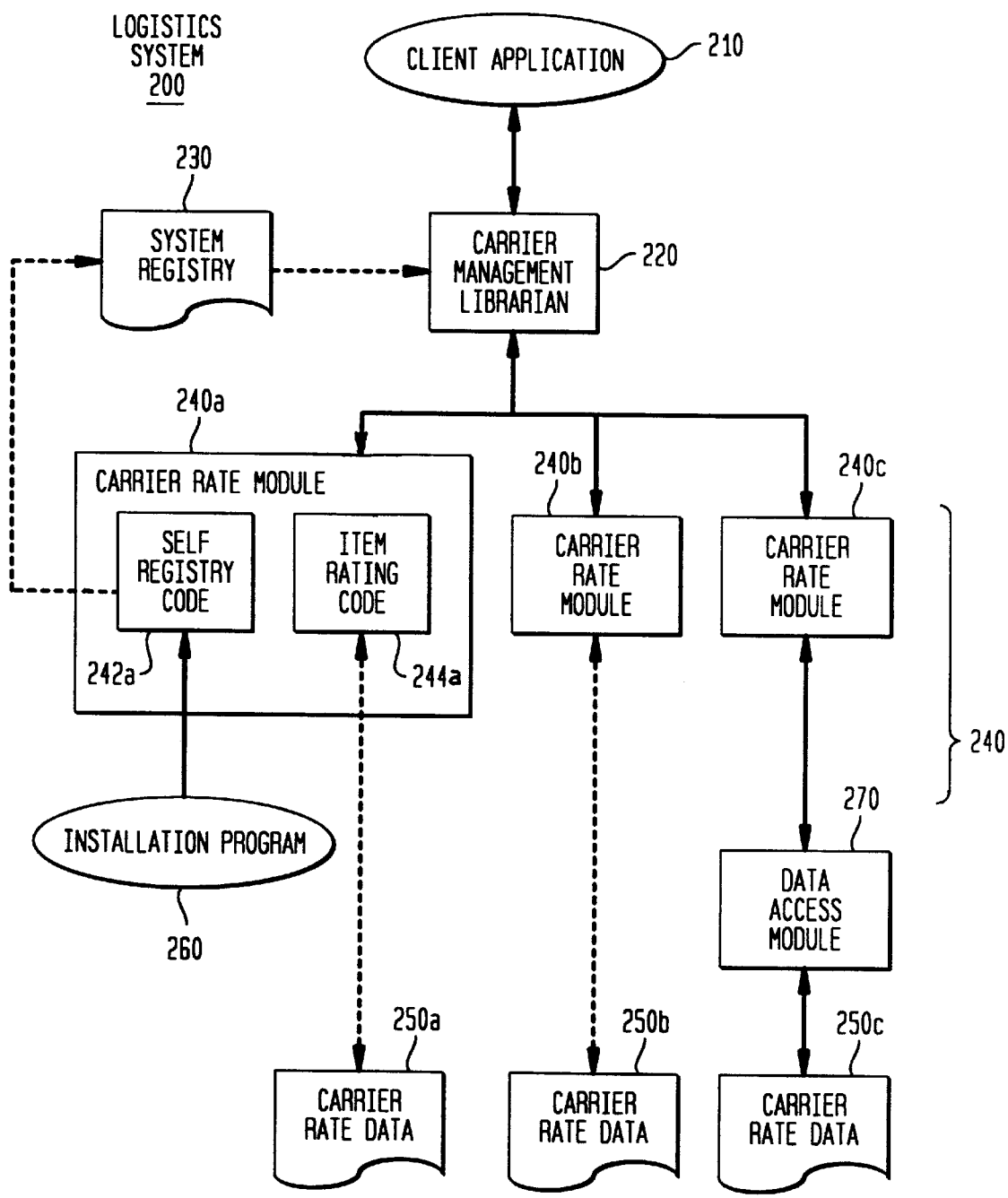
FIG. 2 is a depiction of a logistics system including a carrier manager according to an embodiment of the present invention.

Referring to FIG. 2, depicted is a diagram of a logistics system 200, which provides a client application 210 with item rating functionality for a supported carrier, according to one embodiment of the invention. Client application 210 typically is an executable program that provides an interface for interacting with a user and implements high-level logistics functionality. For example, the client application 210 may be a shipping application, responsible for grouping letters, packages, parcels, bulk goods, commodities, or any other transportable item into shipments to be shipped by a carrier. Some client applications may implement or utilize functions for handling shipping manifests, printing labels, controlling inventory, load balancing, applying postage, and the like. In the system architecture illustrated in FIG. 2, at least some of the item rating functionality is coordinated through carrier management librarian 220.

Carrier management librarian 220 is a module containing instructions for managing a plurality of supported carriers. As described in more detail hereinafter, carrier manager librarian 220 is configured to read a system registry 230 of supported carriers and cause item rating instructions 244 of a carrier rate module 240 corresponding to a selected carrier to be executed. Although the carrier manager librarian 220 can be statically linked into the client application 210, it is preferably dynamically linked into the client application 210. Dynamic linking a module involves loading at run-time the module into the executable space of an executing process, e.g. a portion of virtual memory allocated by the operating system for executing a process such as client application 210. Common examples of these modules include dynamic link library (DLL) modules, shared libraries, and OLE™ and Active™ controls supported by Microsoft Corporation.

By loading the carrier manager librarian 220 directly into the executable space of an executing process, the client application 210 can avail itself of functionality implemented in the module without the overhead incurred for a separate process. Thus, entries in the process table of the operating system are saved and costly context swaps are avoided. OLE and ActiveX controls, sometimes called "OCX," allow for late binding of function calls, remote execution in a distributed or networked environment, and interfacing with the Internet or World Wide Web. A re-entrant version of carrier manager librarian 220 may even be linked and loaded into one executing client application 210 and set up to be invoked by another separately executing client process, e.g. by IPC mechanisms or procedure calls.

Many operating systems such as Windows 95™ and Windows NT™, available from Microsoft Corp., provide a resource called a system registry to contain operational information for software systems. In accordance with one embodiment of the present invention, carrier information and settings are stored in the system registry. The present invention is not limited to storing information in a specially provided system registry. Indeed, any file can be used as registry if it contains a list of carriers identified by a name or token and identifiers of corresponding carrier rate modules 240 in a one-to-one association. For example, such a registry may be implemented on UNIX™ systems or MS-DOS™ by a configuration file.

Figure 3:
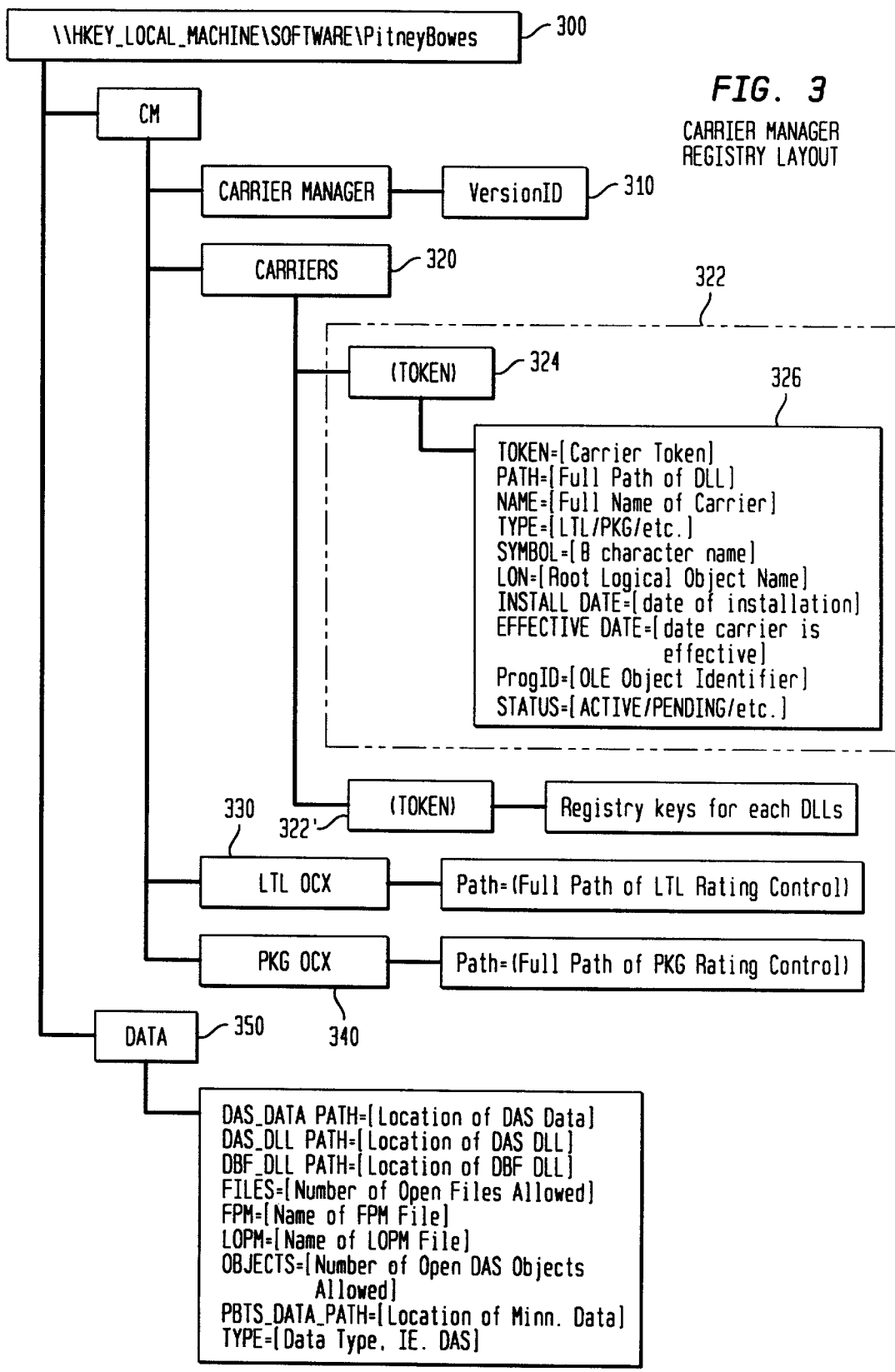
FIG. 3 shows an exemplary registry of supported carriers in accordance with an embodiment of the present invention.

Exemplary carrier information stored in a system registry 230 according to one embodiment of the present invention is illustrated in FIG. 3. In a hierarchically organized system registry 230, the carrier information is preferably placed under one registration key 300, which includes the vendor's name (e.g. Pitney Bowes), for uniqueness purposes. Under registration key 300 is recorded a version ID 310 for use in detecting the presence of incompatible versions of the carrier management librarian 220. Under a "carriers" subkey 320 of registration key 300 is a list of carriers supported in an installation of carrier manager librarian 220. The list includes entries 322, 322', etc., identified by a token 324 and carrier registration data 326. The value of the token 324 is preferably a short string (within eight characters) denoting a carrier. Common token values can include "USPS" for the United States Postal Service, "YELL" for the Yellow Freight System, Inc., "UPS" for the United Parcel Service, etc.

The carrier registration data 326 in each entry 322 under the carriers subkey 320 includes an identifier of a corresponding carrier rate module 240, which contains instructions for rating an item according to business rules and rate data for a carrier. The value of the identifier depends on how the carrier rate modules 240 are implemented. If the carrier rate modules 240 are implemented as DLLs or other run-time loadable libraries, then the identifier contains the full pathname of the library. On the other hand, if the carrier rate modules 240 are implemented as OLE or ActiveX controls, then the module identifier can be a class identifier, such as a guid (globally unique identifier), 128-bit hexadecimal value.

Other information stored in the carrier registration data 326 may include the full name of the carrier, the carrier type, the installation date, and the effective date. If the carrier token is kept short as preferred, then it is desirable to store the full name of the carrier in the carrier registration data 326. The carrier type can be set to "LTL" for bulk goods shipped on a truckload, to "PKG" for ground carriers, "EXP" for air carriers, etc. The carrier type allows other code modules developed for a class of carriers, e.g., to identify relevant carriers from the list of carriers under subkey 320. For example, a module (not shown) for handling the shipment of commodities can produce a bill of lading for LTL or TL shipments for carriers identified as LTL type in the carrier registration data 326. The pathname 330 for such a bill of lading module may be recorded under registration key 300. As another example, a pathname 340 for a package shipment module (not shown) handles ground shipments for relevant carriers. These modules allow for the abstraction and encapsulation of common functionality for carrier types in a single code module according to sound principles of software engineering.

The installation date indicates the date in which the carrier rate module was installed, and the effective date indicates a possibly future date at which the carrier rate calculations are valid. As evident to those skilled in the art, other information relating to a specific carrier can be stored in each entry 322 depending on the particular implementation environment. In fact, most of the information other than the identifier of the corresponding carrier rate module 240 may be omitted when not necessary in the implementation environment. As depicted in FIG. 3, the carrier registration data 326 is stored as a list of keywords and data, but other structures of organizing data, e.g. fixed-width or variable width fields, may be employed.

Also stored under registration key 300 is administrative data 350, useful for an installation of logistics system 200. The particular information stored under administrative data 350 will vary from implementation to implementation and will be evident to those skilled in the art. For example, pathname data for a data access module 270, described in more detail hereinbelow, may be recorded under administrative data 350.

Referring back to FIG. 2, included in the logistics system 200 is a plurality of carrier rate modules 240a, 240b, and 240c, collectively denoted by the numeral 240. Although three carrier rate modules 240 are shown, it is evident that any number of carrier rate modules 240 may be installed on a logistics system 200 and that the particular number installed depends on the customer environment. Only the carrier rate modules 240 for those carriers desired by a user need be installed. For example, at a site in which only packages are sent, the carrier rate modules 240 for LTL rating does not have to be installed.

Each carrier rate module 240 is configured to be loaded at run-time in the executable space of an executing process. Accordingly, the carrier rate modules 240 are preferably implemented with such techniques as DLLs, shared libraries, or by other kinds of dynamic linking, such as OLE and ActiveX controls. Each carrier rate module 240, e.g. carrier rate module 240a, contains item rating code 244a and preferably self-registry code 242a.

As described in more detail hereinafter, the self-registry code 242a, invoked by installation program 260, includes instructions for creating an entry in registry 230 with the information for the corresponding carrier. The item rating code 244a of a carrier rate module 240a contains instructions for rating an item based on business rules for the corresponding carrier and carrier rate data 250a. Accessing the carrier rate data 250a and 250b by the respective item rating code 250a and 250b may occur directly as for carrier rate module 240a, or, as illustrated for carrier rate module 240c, through a data access module 270. The data access module 270 is also configured to be loaded at run-time in the executable space of an executing process, e.g. as a DLL, shared library, OLE control, or any other dynamic linking or loading technique, from information recorded in administrative data 350 in system registry 230.

Installing a New Carrier Rate Module

Figure 4:
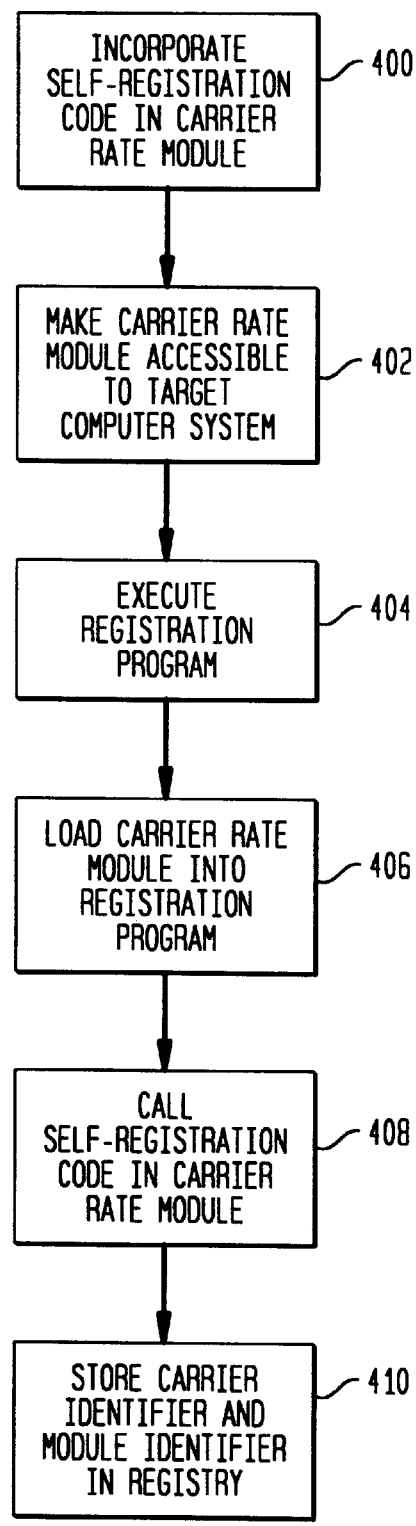
FIG. 4 is a flowchart illustrating the operation of self-registering a carrier rate module according to an embodiment of the present invention.

Support for a new carrier is facilitated by incorporating self-registration instructions 242a along with the item rating code 244a within a new carrier rate module 240a, as illustrated by step 400 in FIG. 4. The self-registration code 242a includes instructions for creating a new entry 322' under the carriers subkey 320 in system registry 230. Specifically, new entry 322' includes at least a carrier identifier, e.g. a short carrier token, for the associated carrier and a module identifier indicating how to load the new carrier rate module 240a.

The particular value of the module identifier depends on the implementation of new carrier rate module 240a. For example, if new carrier rate module 240a is a DLL, then the module identifier is a full pathname of the DLL. As another example, a module identifier for carrier rate modules implemented by OLE controls would be a program identifier or PROG ID, e.g. a unique OLE name. The self-registration code 242a is configured to write other installation information, for example, the installation date, an effective date, a full description of the carrier, etc., as required or desired by the particular operating environment.

In step 402, the new carrier rate module 240a is made available to a target computer system, e.g. by storing it in a computer-readable medium accessible to the target computer system. For example, a CD-ROM containing the new carrier rate module 240a may be loaded into a CD-ROM drive of the target computer system. As another example, the new carrier rate module 240a may be downloaded from an Internet site, e.g. by FTP, TFTP, or other protocol. When the new carrier rate module 240a is made available to the target computer system, the self-registration instructions 242a are executed to register the new carrier rate module 240a.

Preferably, an installation script or program distributed on the same computer-readable medium storing the new carrier rate module 240a includes instructions for causing self-registration code 242a to be executed. The installation program may execute a standard registration program 270, e.g. regsvr32.exe on a Microsoft Windows™ system with a command-line parameter indicating the new carrier rate module 240a (step 404). For example, the command-line parameter may be the pathname of the new carrier rate module 240a.

The registration program is configured to dynamically load and link the carrier rate module 240a specified by its command-line parameter (step 406) and invoke a function in the loaded carrier rate module 240a with a predefined name, e.g. "D11RegisterServer," (step 408). Calling this function causes the self-registration code 242a to be executed, resulting in the creation of a new entry in the system registry 230 (step 410). In particular, the self-registration code 242a is configured to write installation information, including a carrier identifier for the new carrier, a module identifier indicating how to load the carrier rate module 240a, as well as other information such as the installation date, an effective date, a full description of the carrier, etc.

After self-registration, the new carrier rate module 240a is now available for use by carrier manager librarian 220 or any other process examining system registry 230 for using in rating items for its associated carrier.

Rating an Item for a Selected Carrier

Figure 5A:
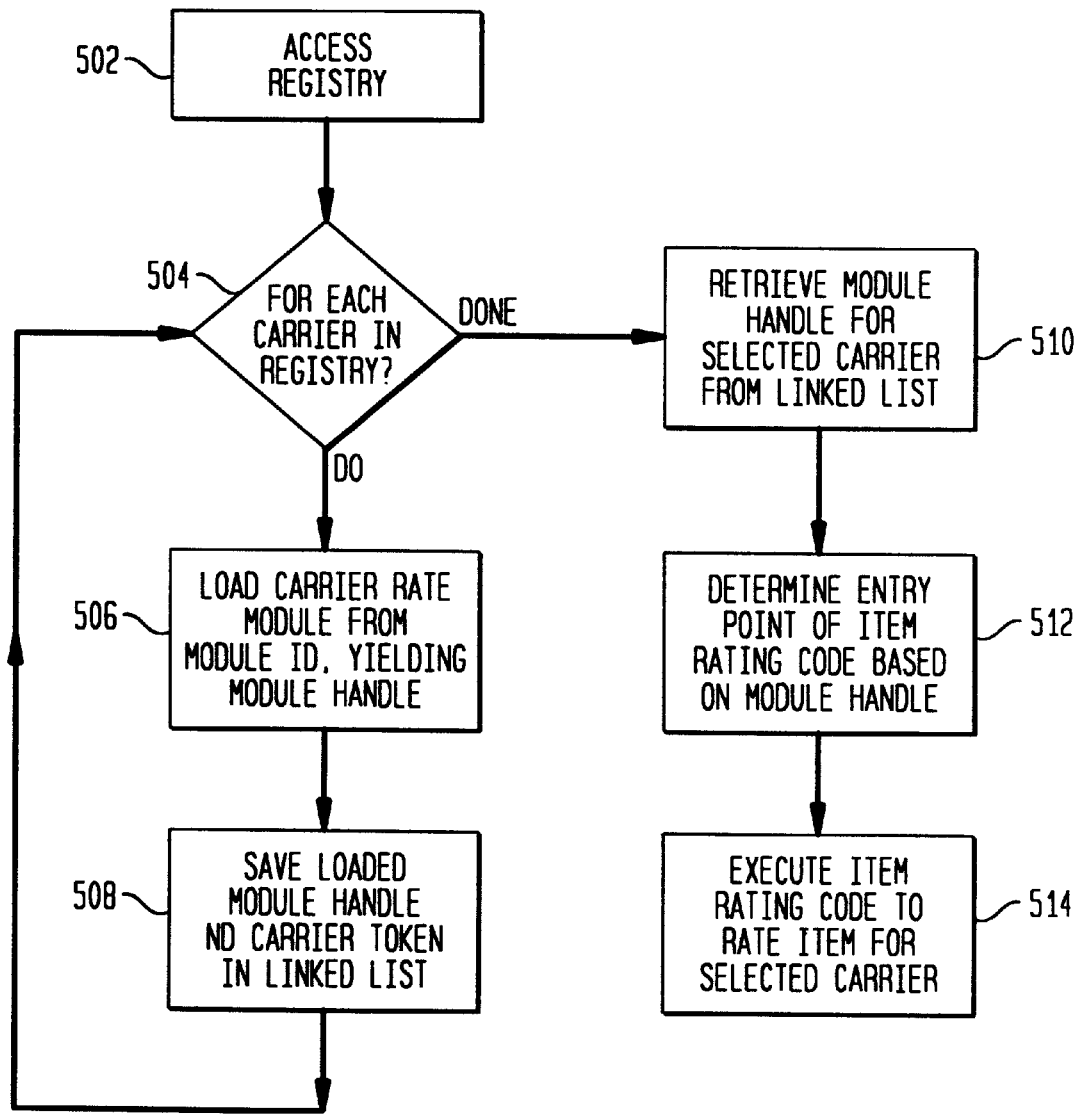
FIG. 5(a) is a flowchart illustrating the operation of rating an item for one of the carriers managed by an embodiment of the present invention.

Referring to FIG. 5(a), the operation of carrier manager librarian 220 according to one embodiment of the present invention is illustrated. When the client application 210 is executed by a user, it is configured to call an initialization routine in the carrier management module 220. During initialization, carrier manager librarian 220 accesses the system registry 230 in step 502 to retrieve information about carrier rate modules installed and registered in the logistics system 200.

Specifically, the carrier manager librarian 220 reads carrier tokens 322 stored under the carriers subkey 320 in the registry 230 (step 504). For each carrier token read, the carrier manager librarian 220 retrieves the associated module identifier for the corresponding carrier rate module, e.g. a full pathname of a carrier rate DLL. Using the module identifier, the carrier manager librarian 220 causes the carrier rate module to be loaded into the executable space of the process executing the carrier manager librarian 220 (step 506). Many operating systems return a handle after loading a module such as a DLL, shared library, or other dynamically linked code segment for access to the functions contained therein. Accordingly, step 508 is performed in which the returned module handle is saved along with the carrier token in a data structure such as a linked list. A handle is a generic term for a pointer, an integer, or other data type that identifies an object or resource manipulated by operating system routines. As evident to those in the art, the use of a linked list is not crucial, since any data structure that allows a set of associated items may be used. For example, alternative implementations of carrier manager librarian 220 may employ such data structures as arrays of records/structures, parallel arrays, stacks, queues, heaps, trees, skip lists, etc.

After initialization, control passes back to the client application 210 that loaded the carrier manager librarian 220 or called its initialization routine. When the client application 210 later proceeds to rate an item to be shipped, the client application 210 invokes the carrier manager librarian 220 with a parameter, e.g. a carrier token, to specify the carrier for which the item is to be rated. In response, carrier manager librarian 210 performs step 510 in which the linked list or other data structure is inspected for an entry corresponding to the carrier token parameter. If the carrier token is found, then the associated module handle is used to obtain an entry point in the previously loaded carrier rate module (step 512). Typically, the entry point is expressed as a pointer to a function, sometimes called a FAR PTR, which can be called to execute instructions in the carrier rate module (step 514). The carrier manager librarian 220 may pass the entry point back to client application 210 for later invocation or call the item rating instructions directly. The item rating instructions, when executed, rate the item for delivery according to the appropriate business rules and carrier rate data.

Figure 6:
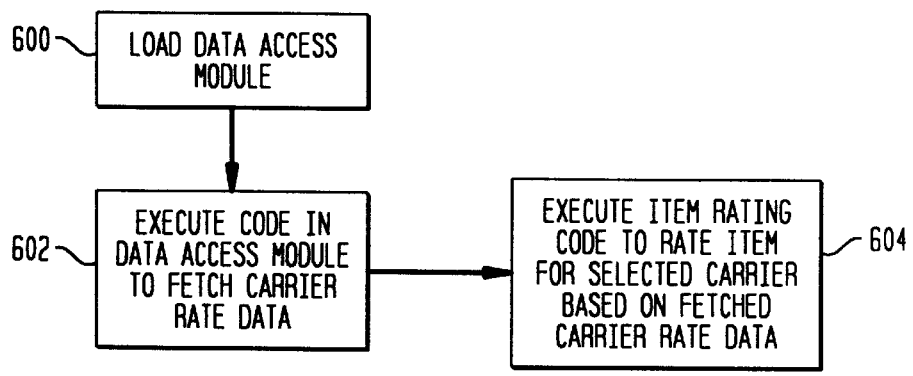
FIG. 6 is a flowchart illustrating the operation of fetching carrier rate data according to an embodiment of the present invention.

When a carrier rate module, e.g. carrier rate module 240c in FIG. 2, is configured to use a run-time loadable data access module 270 as an interface for retrieving carrier rate data 250c, one embodiment of the present invention performs the steps illustrated in FIG. 6. In step 600, the data access module 270 is loaded into the executable space of the executing process, e.g. client application 210. This step may occur when client application 210 is first executed or deferred until necessary to reduce the start up time of client application 210 at an additional coding expense. Since data access module 270 contains instructions for fetching carrier rate data, those instructions are executed to fetch the carrier rate data (step 602). Consequently, the item rating instructions of the carrier rate module 240c can use the carrier rate data for rating the item (step 604). By isolating the carrier rate data access instructions into a separately loadable module, the format and design of the carrier rate data file 250c may be changed without necessitating a modification to the carrier rate module 240c.

Figure 5B:
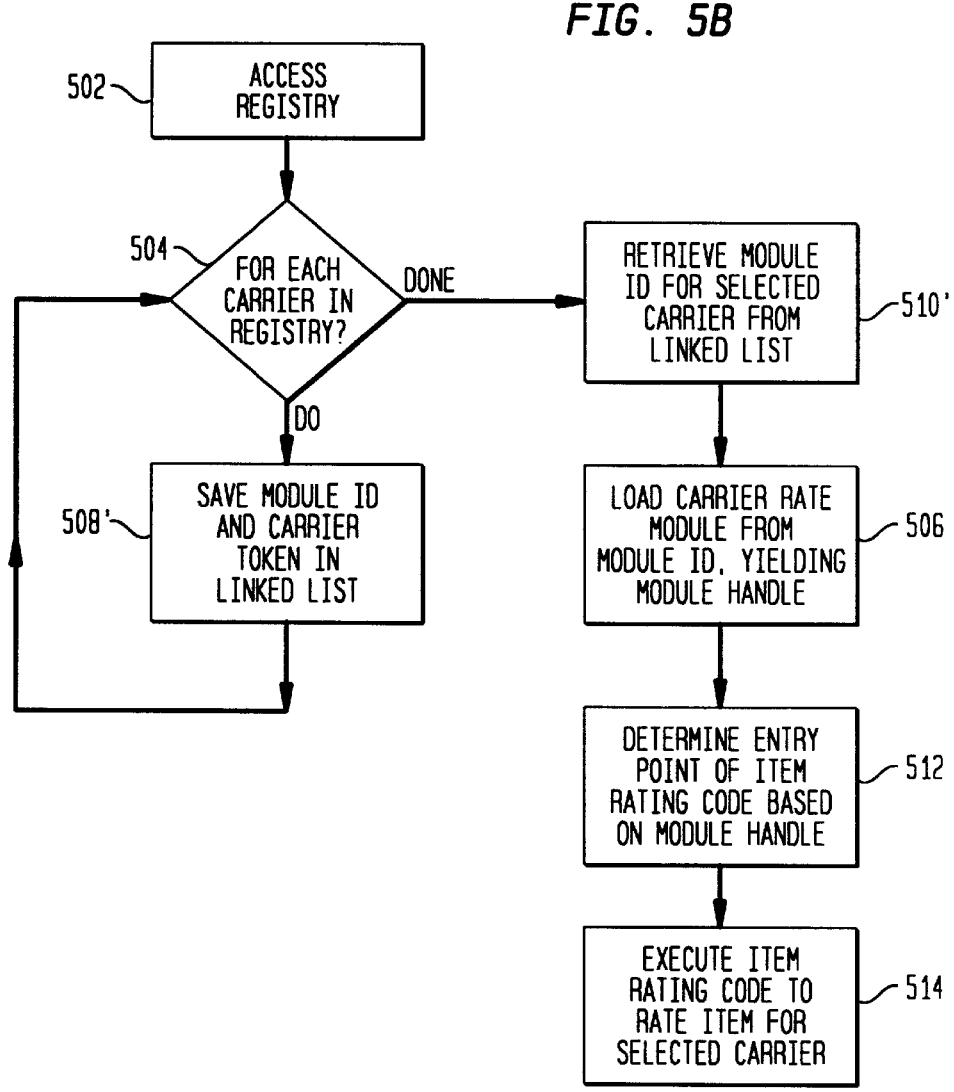
FIG. 5(b) is a flowchart illustrating the operation of rating an item for one of the carriers managed by another embodiment of the present invention.

It may be appreciated that all the registered carrier rate modules are loaded once during initialization time in the embodiment illustrated in FIG. 5(a). This approach may result in an increased start up time for the carrier manager librarian 220. If it is desired to reduce this start up time, then the carrier manager librarian 220 can be configured to load the carrier rate modules on an as-needed basis, as illustrated in FIG. 5(b). In this embodiment, the registry is accessed (step 502) and each carrier is iterated (step 504) as described hereinabove. However, the body of the loop saves the carrier token and the associated module identifier, either a full pathname or an OLE Program ID, accessed from registry 230 (step 508') in the linked list or other data structure. After all the carriers registered in the registry 230 have been processed, control passes back to the client application 210.

When the client application 210 calls the carrier manager librarian 220 with a carrier token as a parameter for rating an item or obtaining a entry point of a routine for rating the item, the carrier manager librarian 220 at step 510' inspects the linked list for an entry containing that carrier token. If there is such an entry, then the carrier rate module is loaded into the executable space based on the module identifier contained in the identified entry (step 506), returning a module handle. A flag can be included in the entry to avoid loading the carrier rate module more than once in a session. Then, an entry point is obtained from the module handle of the previously loaded carrier rate module (step 512). The carrier manager librarian 220 may then pass a function pointer to the entry point back to client application 210 for later invocation or call the item rating instructions directly module (step 514).

Use of carrier rate modules 240, which can be distributed separately from client applications 210, enables the business rules and carrier rate data for individual carriers to be updated without requiring the recompilation, relinking, or redistribution of the client applications. Since each carrier rate module 240 is loaded into the executable space of an executing process, e.g. client application 210, this approach is less resource intensive than the approach of executing the carrier rate modules as separate programs that communicate with the client program via an IPC mechanism. For example, dynamically loadable modules do not use operating system resources, such as an entry in a process table. As another example, communication between client application 210 and carrier rate module 240 is accomplished through a function call, without expensive context swaps or tokenization of the parameters to an item rating function.

Use of a registry 230 in conjunction with a carrier manager librarian module 220 allows new carrier rate modules 240 to be installed without requiring reinstallation of client application 210 or any other program. Since each carrier rate module 240 includes self-registration code 242 at a predefined location, the registration information is encapsulated in the new carrier rate module and transferred to a registry 230 on installation. Therefore, the information about which carriers are available at a customer is found in the registry and not hard-coded into a program. Consequently, the need to redistribute software components to an existing installation is removed.

While this invention has been described in connection with what is presently considered to be the most practical and preferred embodiments, it is to be understood that the invention is not limited to the disclosed embodiment, but on the contrary, is intended to cover various modifications and equivalent arrangements included within the spirit and scope of the appended claims.

What is claimed is:

1. A carrier management system having a microprocessor, said system further comprising:
    (a) a plurality of carrier rate modules, each of the carrier rate modules containing item rating instructions arranged to rate an item for a respective carrier from among a plurality of carriers;
    (b) a registry recording carrier identifiers corresponding respectively to the carriers in a one-to-one association with module identifiers indicating respectively how to load the carrier rate modules; and
    (c) a carrier management librarian module containing carrier management instructions arranged to:
        (i) access the registry;
        (ii) load a selected carrier rate module corresponding to the selected carrier, based on a module identifier accessed in the registry, into the executable space of a client application executing the carrier management librarian module; and
        (iii) identify an entry point for the item rating instructions in the loaded, selected carrier rate module in response to an identifier corresponding to the selected carrier specified by the client application.

2. The carrier management system of claim 1, wherein the carrier management instructions are further arranged to load all the carrier rate modules corresponding to the carriers into the executable space of the executing process based on all the module identifiers of modules recorded in the registry.

3. The carrier management system of claim 1, wherein the carrier management instructions are further arranged to:
    (a) identify the selected carrier rate module from among the plurality of carrier rate modules based on an identifier corresponding to the selected carrier; and
    (b) load the selected carrier rate module after identifying the selected carrier rate module.

4. The carrier management system of claim 1, wherein the carrier management instructions are further arranged to dynamically link the carrier rate module corresponding to the selected carrier into the executing process.

5. The carrier management system of claim 1, further comprising a carrier rate data access module containing data access instructions arranged to access carrier rate data stored in a file on a non-volatile computer readable medium; wherein at least one of the carrier rate modules further contains instructions arranged to:
    (a) load the carrier rate data access module;
    (b) execute said data access instructions for accessing the carrier rate data for the corresponding carrier; and
    (c) execute said item rating instructions for rating the item based on the carrier rate data.

6. The carrier management system of claim 1, wherein the carrier management librarian module is configured to be loaded into the executable space of the client application.

7. A carrier management system, comprising:
    (a) a client application for interacting with a user and performing logistics functions in response;
    (b) a plurality of carrier rate modules, each of the carrier rate modules containing item rating instructions arranged to rate an item for a respective carrier from among a plurality of carriers;
    (c) a registry recording carrier identifiers corresponding respectively to the carriers in a one-to-one association with module identifiers indicating respectively how to load the carrier rate modules; and
    (d) a carrier management librarian module executable by the client application and containing carrier management instructions arranged to:
        (i) access the registry to retrieve the module identifiers recorded therein;
        (ii) load a selected carrier rate module corresponding to the selected carrier, based on a module identifier accessed in the registry, into the executable space of the client application; and
        (iii) identify an entry point for the item rating instructions in the loaded, selected carrier rate module in response to an identifier corresponding to the selected carrier specified by the client application; and wherein the client application is configured to call the entry point to rate an item for the selected carrier.

8. The carrier management system of claim 7, wherein the carrier management instructions are further arranged to load all the carrier rate modules corresponding to the carriers into the executable space of the executing process based on all the module identifiers of modules recorded in the registry.

9. The carrier management system of claim 7, wherein the carrier management instructions are further arranged to:
    (a) identify the selected carrier rate module from among the plurality of carrier rate modules based on an identifier corresponding to the selected carrier; and
    (b) load the selected carrier rate module after identifying the selected carrier rate module.

10. The carrier management system of claim 7, wherein the carrier management instructions are further arranged to dynamically link the carrier rate module corresponding to the selected carrier into the executing process.

11. The carrier management system of claim 7, further comprising a carrier rate data access module containing data access instructions arranged to access carrier rate data stored in a file on a non-volatile computer readable medium; wherein at least one of the carrier rate modules further contains instructions arranged to:

(a) load the carrier rate data access module;

(b) execute said data access instructions for accessing the carrier rate data for the corresponding carrier; and (c) execute said item rating instructions for rating the item based on the carrier rate data.

12. The carrier management system of claim 7, wherein the carrier management librarian module is configured to be loaded into the executable space of the client application.

13. A method of rating an item for a selected carrier from among a plurality of carriers in a carrier management system, said method comprising the computer-implemented steps of:

(a) accessing a registry recording carrier identifiers corresponding respectively to the carriers in a one-to-one association with module identifiers indicating how to load corresponding carrier rate modules;

(b) loading a plurality of the carrier rate modules, at least one of which corresponding to the selected carrier, into the executable space of an executing client application based on the carrier identifiers;

(c) identifying an entry point for item rating instructions contained in a loaded carrier rate module corresponding to the selected carrier item based on a carrier identifier corresponding to the selected carrier specified by the executing client application, said item rating instructions arranged to rate the item for the selected carrier; and executing the item rating instructions.

14. The method of claim 13, wherein the step of loading a plurality of the carrier rate modules includes the step of loading all the carrier rate modules corresponding to the carriers into the executable space of the executing client application based on all the module identifiers recorded in the registry.

15. The method of claim 13, further comprising the computer-implemented step of identifying a selected carrier rate module from among the carrier rate modules based on a selected carrier identifier corresponding to the selected carrier and the carrier identifiers recorded in the registry, wherein the step of loading a plurality of the carrier rate modules includes the step of loading the selected carrier rate module after identifying the selected carrier rate module.

16. The method of claim 13, wherein the step of loading a plurality of the carrier rate modules, at least one of which corresponding to the selected carrier, into the executable space of the executing client application based on the module identifiers includes the step of dynamically linking the carrier rate module corresponding to the selected carrier into the executing client application.

17. The method of claim 13, further including the computer-implemented steps of:

(a) loading a carrier rate data access module into the executable space of the executing client application, said carrier rate data access module containing data access instructions arranged to access carrier rate data, said carrier rate data stored in a file on a non-volatile computer readable medium;

(b) execute said data access instructions for accessing the carrier rate data; and (c) execute said item rating instructions for rating the item based on the carrier rate data.

18. A computer readable medium bearing thereon sequences of instructions for managing a plurality of carrier rate module corresponding respectively to a plurality of carriers for an executing client application, said sequences of instructions comprising sequences of instructions for performing the computer-implemented steps of:

(a) accessing a registry recording carrier identifiers corresponding respectively to the carriers in a one-to-one association with module identifier indicating how to load the corresponding carrier rate modules;

(b) loading a plurality of the carrier rate modules, at least one of which corresponding to the selected carrier, into the executable space of the executing client application based on the carrier identifiers; and (c) identifying an entry point for item rating instructions contained in a loaded carrier rate module corresponding to the selected carrier item based on a carrier identifier corresponding to the selected carrier specified by the executing client application, said item rating instructions arranged to rate the item for the selected carrier.

19. The computer readable medium of claim 18, wherein the step of loading one or more of the carrier rate modules includes the step of loading all the carrier rate modules corresponding to the carriers into the executable space of the executing client application based on all the module identifiers recorded in the registry.

20. The computer readable medium of claim 18, wherein:

(a) said sequences of instructions further comprises sequences of instructions for performing the step of identifying a selected carrier rate module from among the carrier rate modules based on a selected carrier identifier corresponding to the selected carrier and the carrier identifiers recorded in the registry; and (b) the step of loading a plurality of the carrier rate modules includes the step of loading the selected carrier rate module after identifying the selected carrier rate module.

21. The computer readable medium of claim 18, wherein the step of loading a plurality of the carrier rate modules, at least one of which corresponding to the selected carrier, into the executable space of the executing client application based on the module identifiers includes the step of dynamically linking the carrier rate module corresponding to the selected carrier into the executing client application.

* * * * *